United States Patent
Jeon et al.

(10) Patent No.: US 11,289,723 B2
(45) Date of Patent: Mar. 29, 2022

(54) CONTROL METHOD FOR FUEL CELL SYSTEM TO PREVENT FREEZING IN AIR EXHAUST SYSTEM

(71) Applicants: Hyundai Motor Company, Seoul (KR); Kia Motors Corporation, Seoul (KR)

(72) Inventors: Kang Sik Jeon, Gyeonggi-Do (KR); Jae Hun Jang, Jeollanam-do (KR); Sung Ho Yang, Gyeonggi-do (KR); Sung Mun Cho, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 77 days.

(21) Appl. No.: 16/405,604

(22) Filed: May 7, 2019

(65) Prior Publication Data
US 2020/0194812 A1   Jun. 18, 2020

(30) Foreign Application Priority Data

Dec. 12, 2018   (KR) .......................... 10-2018-0160261

(51) Int. Cl.
*H01M 8/04223* (2016.01)
*H01M 8/04746* (2016.01)
(Continued)

(52) U.S. Cl.
CPC ......... *H01M 8/04253* (2013.01); *B60L 58/33* (2019.02); *B60L 58/34* (2019.02);
(Continued)

(58) Field of Classification Search
CPC ......... H01M 8/04253; H01M 8/04753; H01M 8/04201; H01M 8/04701; H01M 8/04228; H01M 8/04559; H01M 8/04992; H01M 8/04626; H01M 8/04358; H01M 8/0432; H01M 8/04089; H01M 8/04179; H01M 8/04; H01M 8/04029; H01M 8/04768; H01M 8/043; H01M 8/04955;
(Continued)

(56) References Cited

U.S. PATENT DOCUMENTS

2011/0115491 A1* 5/2011 Jung ................. H01M 8/04955
                                                                324/431
2016/0141655 A1* 5/2016 Naganuma .............. B60L 50/71
                                                                429/414
(Continued)

FOREIGN PATENT DOCUMENTS

KR        20150072685 A        6/2015

*Primary Examiner* — Tae-Sik Kang
(74) *Attorney, Agent, or Firm* — Mintz Levin Cohn Ferris Glovsky and Popeo, P.C.; Peter F. Corless

(57) ABSTRACT

A control method for a fuel cell system is provided to prevent freezing in an air exhaust system of the fuel cell system. The method prevents freezing in the exhaust system by specifying a vehicle condition in which possibility of freezing is high and operating the fuel cell system based on different vehicle-specific standards. The performs air supercharging control based on an ambient temperature and a temperature of cooling water, air supercharging control by applying weights based on inclinations of a vehicle, and a forced heating logic using a COD heater.

15 Claims, 4 Drawing Sheets

(51) Int. Cl.
  *H01M 8/04082* (2016.01)
  *H01M 8/04701* (2016.01)
  *H01M 8/04228* (2016.01)
  *H01M 8/04537* (2016.01)
  *H01M 8/04992* (2016.01)
  *B60L 58/34* (2019.01)
  *B60L 58/33* (2019.01)
  *H01M 8/0432* (2016.01)
  *B60K 6/32* (2007.10)

(52) U.S. Cl.
  CPC ... *H01M 8/04201* (2013.01); *H01M 8/04228* (2016.02); *H01M 8/04358* (2013.01); *H01M 8/04559* (2013.01); *H01M 8/04626* (2013.01); *H01M 8/04701* (2013.01); *H01M 8/04753* (2013.01); *H01M 8/04992* (2013.01); *B60K 6/32* (2013.01); *B60Y 2200/91* (2013.01); *B60Y 2200/92* (2013.01); *B60Y 2400/202* (2013.01); *H01M 2250/20* (2013.01)

(58) Field of Classification Search
  CPC ............ B60Y 2200/91; B60Y 2200/92; B60Y 2400/202; B60L 2240/36; B60L 58/32; B60L 2240/642; B60L 58/34; B60L 58/33; B60L 1/003; B60L 1/02; B60L 2240/80; B60L 2240/662; B60L 3/0053; B60K 6/32; Y02E 60/50; Y02T 10/70
  See application file for complete search history.

(56) References Cited

U.S. PATENT DOCUMENTS

2017/0062846 A1\* 3/2017 Kim .................. H01M 8/04044
2017/0179512 A1\* 6/2017 Eschenbach ............ B60L 53/00
2017/0187053 A1\* 6/2017 Hoshi ............... H01M 8/04373

\* cited by examiner 210  220  230

220
221
222

10% Nose-Up Position

First Freezing   Second Freezing

CONTROL METHOD FOR FUEL CELL SYSTEM TO PREVENT FREEZING IN AIR EXHAUST SYSTEM

CROSS REFERENCE TO RELATED APPLICATION

The present application claims priority to Korean Patent Application No. 10-2018-0160261, filed Dec. 12, 2018, the entire contents of which is incorporated herein for all purposes by this reference.

BACKGROUND

Field of the Invention

The present invention relates generally to a control method for a fuel cell system and, more particularly, to a control method for a fuel cell system that prevents freezing in an air exhaust system of the fuel cell system.

Description of the Related Art

A fuel cell vehicle is an eco-friendly vehicle that generates propulsion using an electric motor by reacting hydrogen and oxygen in a fuel cell stack. Most of water produced on an air electrode due to the reaction of hydrogen and oxygen is discharged, in the form of droplets or vapor, to a drain hose in a bottom central portion of the vehicle and an exhaust pipe in a rear portion of the vehicle through an air exhaust system. To minimize the discharge of water to the exhaust pipe, a muffler in an intermediate portion of the air exhaust system is configured to separate water and air. Most of the produced water is discharged, in the form of droplets, to the drain hose attached to the bottom end of the muffler. When freezing occurs in the air exhaust system while the fuel cell vehicle is being driven, there is a risk of shutdown of the vehicle.

The foregoing is intended merely to aid in the understanding of the background of the present invention, and is not intended to mean that the present invention falls within the purview of the related art that is already known to those skilled in the art.

SUMMARY

When a vehicle is idling after being started, emitted water may freeze in a drain hose. When water accumulated in a pipe without being emitted is frozen, air may not be supplied efficiently, and in severe cases, the vehicle may be shut down. Accordingly, the present invention provides a control method able to prevent an air exhaust system from freezing by operating components of a fuel cell system without addition of hardware.

Also provided is a control method and system that prevent freezing in the exhaust system by specifying a vehicle condition in which possibility of freezing is high and operating the fuel cell system based on different vehicle-specific standards (i.e. standards different according to vehicle type). Also provided is a control method that determines a shut down the fuel cell system to prevent irreversible damage to a fuel cell stack.

In order to achieve the above object, according to one aspect of the present invention, a control method for a fuel cell system is provided. The method may include performing air supercharging control to increase a flow rate of air supplied when an ambient temperature is less than a predetermined reference temperature and a temperature of cooling water of a fuel cell stack is in a predetermined range of temperature of supercharged air when a vehicle is in a key-on position. The control method may further include determining an inclination of the vehicle. When the inclination of the vehicle is greater than an inclination threshold value, the air supercharging control may determine an amount of supercharged air by applying a weight based on the inclination of the vehicle.

The control method may further include operating a cathode oxygen depletion (COD) heater when a state, in which an amount of power consumed by air conditioning is less than a predetermined reference value, the ambient temperature is less than a predetermined first temperature, and the temperature of cooling water of the fuel cell stack is less than a predetermined second temperature, is maintained for a predetermined first period of time. When the ambient temperature is less than a predetermined fifth temperature, when abnormality in the flow rate of air or the opening degree of the air pressure control value occurs and a reverse voltage state of the fuel cell stack continues for a predetermined third period of time or longer, the fuel cell system may be shut down to prevent the fuel cell stack from being damaged.

According to exemplary embodiments of the present invention, it may be possible to prevent freezing in an air exhaust system during the winter by operating internal components of a fuel cell system without adding hardware components, such as a heater, to the air exhaust system, a drain hose, or the like. In addition, according to the present invention, it may be possible to prevent problems, such as a vehicle shutdown, by preventing freezing in the air exhaust system by only supercharging air without "unnecessary fuel consumption", based on determination of conditions around a vehicle, such as an ambient temperature, a temperature of cooling water at a stack outlet, and a ramp.

Furthermore, even when anti-freezing control is unable to be enabled by only supercharging air, it may be possible to forcibly increase the temperature of cooling water of a fuel cell stack by operating a specific component, such as a COD heater or a bypass valve, so that a fuel cell system may be reliably operated in any traveling conditions in the winter or during colder weather temperatures. Even if the air exhaust system is frozen, it may be possible to accurately diagnose the possibility of secondary damage to the fuel cell stack, due to freezing and generation of a reverse voltage, and perform a preemptive response, such as a shutdown of the fuel cell system, to prevent the fuel cell stack from being irreversibly damaged due to exposure to the reverse voltage for a long period of time.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a control method for a fuel cell system to prevent freezing in an air exhaust system of the fuel cell system, according to exemplary embodiments of the present invention, will be described with reference to the accompanying drawings.

Figure 1:
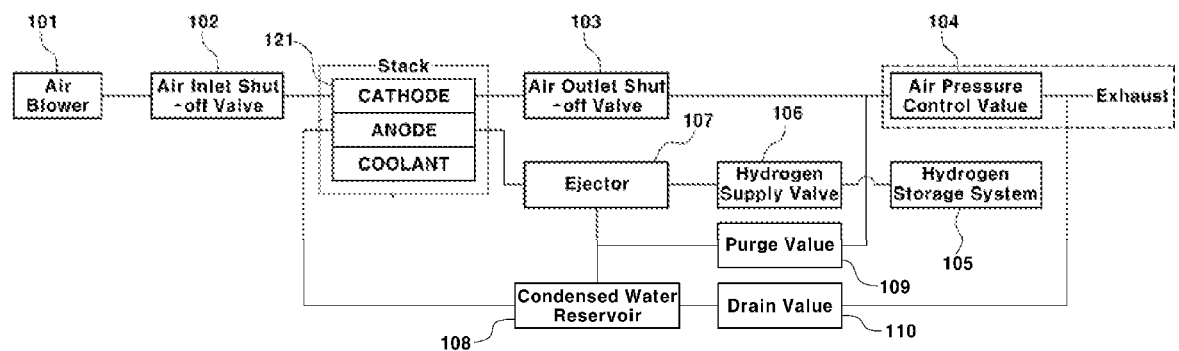
FIG. 1 is a block diagram illustrating a typical configuration of a fuel cell system according to the related art.
Figure 2:
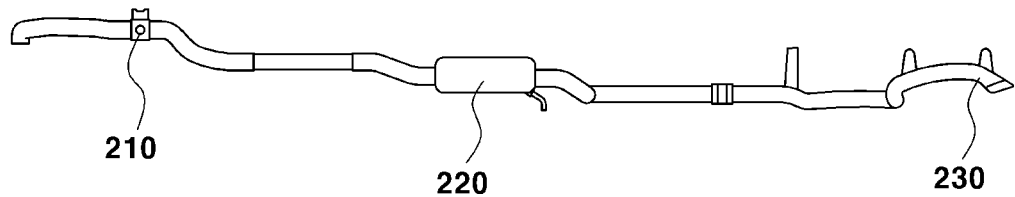
FIG. 2 is a schematic view illustrating an air exhaust system of the fuel cell system according to an exemplary embodiment of the present invention.

FIG. 1 is a block diagram illustrating a typical configuration of a fuel cell system, while FIG. 2 is a schematic view illustrating an air exhaust system of the fuel cell system. As illustrated in FIG. 1, a hydrogen supply system and an air supply system are connected to a fuel electrode and an air electrode of a fuel cell stack, and fuel and air are discharged outwards via the exhaust system.

In other words, an air supply unit may include an air blower 101 and an air inlet shut-off valve 102 disposed on the front end of the air electrode 121 of the fuel cell stack. An air outlet shut-off valve 103 and an air pressure control valve 104 may be disposed sequentially on the rear end of the air electrode 121 to discharge air. In addition, a hydrogen supply unit may be connected to a hydrogen storage system 105 containing hydrogen, and may include a hydrogen supply valve 106 and an ejector 107. A recirculation line, through which fuel ejected toward the fuel electrode through the ejector 107 is recirculated, may be disposed on the rear end of the fuel electrode.

A condensed water reservoir 108 for collecting condensed water may be disposed on the recirculation line, as illustrated in FIG. 1. When condensed water collected in the condensed water reservoir 108 reaches a predetermined level or greater, a drain valve 110 may discharge condensed water. In addition, a purge valve 109 for hydrogen purging may be disposed on the recirculation line. According to this configuration, when the purge valve 109 is opened, gas may be discharged from the fuel electrode.

FIG. 2 illustrates the air exhaust system of the fuel cell system illustrated in FIG. 1. As illustrated in FIG. 2, an air pressure control valve 210 may be disposed on the front end of the air exhaust system of the fuel cell system and a muffler 220 may be disposed on the rear end of the air pressure control valve 210 to reduce exhaust noise. An exhaust pipe 230 may be disposed on the terminal portion of the exhaust system, in the rear of the muffler 220 to discharge water through the exhaust pipe 230. The exhaust pipe 230 may have a T-shaped branch structure that extends from the muffler, with a height difference as illustrated in FIG. 2.

Figure 3:
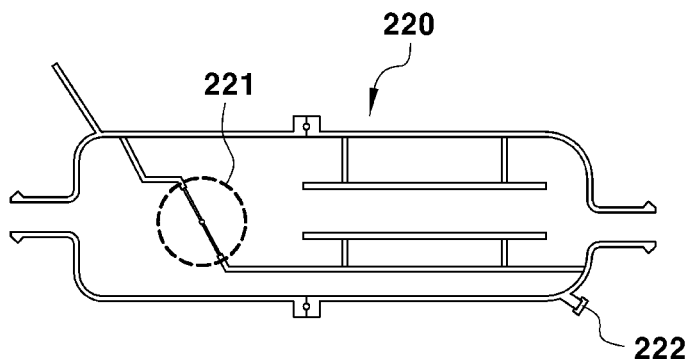
FIG. 3 is a cross-sectional view of the muffler disposed in the air exhaust system according to an exemplary embodiment of the present invention.

The muffler of the air exhaust system may reduce exhaust noise and allows relative-large droplets of discharge water to flow downwards and particulates of water to be discharged outwards through the exhaust pipe in the rear end after having flown through an etched sieve. In this regard, FIG. 3 illustrates a cross-section of the muffler 220 disposed in the air exhaust system. As illustrated in FIG. 3, an etched mesh 221 may be provided inside the muffler 220, a flow passage may be disposed below the etched mesh, a drain-hole 222 may be provided below the flow passage, and a drain hose may be connected to the drain-hole 221.

Particularly, about 80 to 90% of discharge water may be discharged downwards from the vehicle through the drain hose. When the drain hose is frozen, discharge water may accumulate in a pipe, instead of being discharged toward the exhaust pipe due to a height difference in the terminal portion of the exhaust system. Discharge water, accumulated in this manner, may be frozen in the winter or during colder temperature which may clog the air exhaust system and interrupt a suitable supply of air. When a large load is not required, such as when stopping, electric power necessary for the system may be supplied only using a high-voltage battery to preserve the endurance of the fuel cell stack and improve fuel efficiency (FC stop).

In contrast, when a battery level is equal to or less than a predetermined level of the state of charge (SOC) of the high-voltage battery, the fuel cell stack is restarted (FC start). Accordingly, while the vehicle is being driven, the fuel cell (FC) stop process and the FC start process may be repeated. Exemplary embodiments use FC start and FC start technology. Herein, when vehicle load is large, such as during a maximum operation of an air conditioning heater, the FC start and the FC stop are repeated at a relatively-short period (i.e. about 10 minutes or less; the high-voltage battery is frequently charged and discharged). In a no load case due to turning off of an air conditioning system, the period may be extended to as long as five times (about 45 minutes).

When the vehicle is not in the FC stop state, a predetermined amount of air must be supplied to the fuel cell stack for electricity generation. In particular, the amount of air may be determined based on the amount of consumed current of the fuel cell stack. However, in the case of low current (e.g. less than about 20A), produced water may be unable to be discharged, since the amount of introduced air is minimal A term "minimum flow rate of air" is used as a concept indicating a lowest limit at which produced water may be discharged. For example, the minimum flow rate of air may be set to be about 320 LPM, based on 440 cells in the fuel cell stack. This flow rate may be set to be able to output current of about at least 20A from the fuel cell stack, regardless of the temperature of the fuel cell stack.

Accordingly, even when the fuel cell system is idling, when the vehicle is not in the FC stop state, the air blower 101 may be operated to supply air based on the minimum flow rate of air. In addition, to prevent freezing in the air pipe, it is important to prevent freezing in the drain hose of the muffler. In other words, the air blower must be operated at specific revolutions per minute (RPM) or greater to discharge water outwards by overcoming the height difference in the exhaust pipe.

1. Air Supercharging Control Depending on Cooling Water Temperature and Ambient Temperature An exemplary embodiment of the present invention is characterized by a control logic by which air is supercharged based on the temperature of cooling water and the ambient air temperature when the vehicle is in a key-on position. To supercharge air based on temperature of cooling water and the ambient air temperature indicates increasing the minimum flow rate of air. When the minimum flow rate of air is increased in specific conditions, freezing in the exhaust system may be prevented. In this regard, the temperature of cooling water, in particular, the temperature of cooling water at an outlet of the fuel cell stack, may be used as a parameter reflecting the temperature of the fuel cell stack.

In general, the temperature of cooling water of the fuel cell stack (or stack cooling water) is in the range from about 55° C. to 75° C. while the vehicle is being driven. The temperature of air discharged to the exhaust system or the temperature of produced water is similar to this range. In this temperature range, even when the ambient air has an extremely low temperature of about −30° C., no freezing occurs within the air exhaust system. However, after a cold start or when the vehicle has been left idling, the temperature of the fuel cell stack does not exceed a temperature range of about 30° C. to 40° C., and a minimal amount of air is exhausted and a minimal amount of water is produced, due to low-power operation in the idling position. Accordingly, discharge water is gradually cooled while exiting through the exhaust system, and since the surroundings are cold, freezing may occur at the terminal portion of the drain hose.

In this regard, an exemplary embodiment of the present invention may include performing air supercharging control to supply an amount of air greater than a predetermined minimum flow rate of air to prevent freezing in the air exhaust system when the temperature of stack cooling water remains in a low temperature level for a predetermined period of time. In other words, the present control process may supply an excessive amount of air, compared to a flow rate preset to a typical environment. More particularly, the control process may be performed to determine the excessive amount of air based on the ambient air temperature and the temperature of cooling water. According to this air supercharging control process, it may be possible to discharge a greater amount of water having a relatively high temperature, thereby preventing freezing in the air exhaust system.

In addition, since the air supercharging control process is performed, the air blower may be configured to rotate at a higher revolutions per minute (RPM), thereby consuming a greater amount of current, which is supplied by the fuel cell stack. In other words, the air supercharging control process performed as above causes the fuel cell stack to output a greater amount of current, which consequently increases the temperature of operation of the fuel cell stack. Such an increase in the temperature of the fuel cell stack may effectively contribute to prevention of freezing in the exhaust system. As a control entry condition for the air supercharging control process, the temperature of cooling water at the outlet of the fuel cell stack, reflecting the temperature of the fuel cell stack, as well as the ambient air temperature, may be considered.

The degree of air supercharging may vary based on the ambient air temperature. At a temperature of about 0° C. or greater, supercharging is not necessary. As the temperature decreases toward about −30° C., the air supercharging control process may be performed to supercharge a greater amount of air, and thus, the air pipe may be prevented from freezing. Therefore, according to an exemplary embodiment, the air supercharging control process may be performed when the ambient temperature is equal to or less than about 0° C., and the amount of supercharged air may be set to increase as the ambient temperature decreases. In this regard, the amount of supercharged air may be set to linearly increase as the ambient temperature decreases.

In addition, when the fuel cell stack is super-cooled at a temperature of about 20° C. or less, a greater amount of "cold" water is discharged due to supercharged air and the drain hose may be frozen more rapidly. Accordingly, an exemplary embodiment of the present invention may be configured such that the temperature range of stack cooling water for air supercharging is designated and the air supercharging control process is performed only when the current temperature of stack cooling water is within the temperature range for air supercharging. For example, the temperature range for air supercharging may be a temperature range having an upper limit and a lower limit, and more particularly, may range from about 20° C. to 55° C. In this regard, the temperature of stack cooling water may be the temperature of cooling water of at the outlet of the fuel cell stack.

Further, information regarding the minimum flow rate of air may be stored in a memory of a controller in the form of a data map in which flow rates of air based on the ambient temperature and the temperature of cooling water are specified. For example, the data map may be a three-dimensional data map including information regarding flow rates of air based on the ambient temperature and the temperature of cooling water.

2. "Additional" Air Supercharging Depending on Inclination of Vehicle

Another exemplary embodiment of the present invention is characterized in that the air supercharging control process is performed such that different amounts of air are supercharged based on the inclination of the vehicle (e.g., road slope or inclination). When the vehicle is stopped or parked on an inclined ramp, discharge water may accumulate more easily in the pipe.

Figure 4:
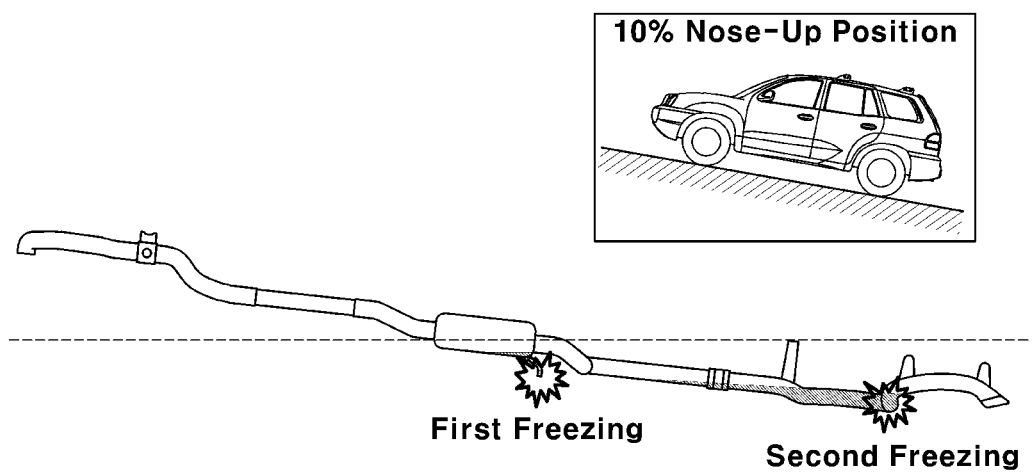
FIG. 4 is a schematic view illustrating that freezing in the air exhaust system is influenced by the inclination of the vehicle according to an exemplary embodiment of the present invention.

FIG. 4 illustrates that freezing in the air exhaust system is influenced by the inclination of the vehicle. As illustrated in FIG. 4, when the vehicle is located on a ramp or inclined road on which the vehicle is in a nose-up (e.g., the vehicle is directed up the incline) position of about 10%, the air exhaust system has an inclination of about 10% due to the inclination of the vehicle. Particularly, after first freezing occurs in the drain hose, the air exhaust system may be clogged relatively early due to second freezing. In contrast, when the vehicle is located on a ramp or inclined road on which the vehicle is in a nose-down (e.g., the vehicle is directed down the incline) position, no problem of freezing occurs, since water flows toward a humidifier having a relatively high temperature, instead of flowing toward the drain hose. Accordingly, when the inclination of the vehicle is detected by a vehicle inclination sensor to be equal to or greater than a predetermined inclination S1 (e.g. an inclination of about 10%), the present exemplary embodiment may perform the control process to increase the amount of supercharged air based on the inclination by imparting a weight a to a previous amount of supercharged air. Although the weight a may be gradually increased based on the inclination, at values equal to or greater than a threshold value S1 of the inclination, the weight a may be applied the same.

3. Forced Heating of Stack according to Vehicle Load

It may be possible to prevent freezing in the air exhaust system to a predetermined extent by selective supply of air based on the ambient temperature and the temperature of the fuel cell stack. However, when the vehicle is left in a low-load idling position by turning the air conditioning heater off or driving the air conditioning heater in a low level (e.g., power consumed by air conditioning<P1), the FC stop time may be increased (not exceeding 40 minutes). In particular, there is no load source for increasing the temperature of the fuel cell stack. When air is supercharged in this case, an adverse effect in that the drain hose is frozen more rapidly may occur, as described above.

Particularly, the freezing temperature may vary based on the ambient temperature. When the ambient temperature is equal to or less than a predetermined temperature T1 (e.g. about −15° C.), freezing may occur frequently. When the temperature of cooling water at the outlet of the fuel cell stack is maintained at a predetermined temperature T2 (e.g. about 43° C.) or less for a predetermined period of time t1 (e.g. about 1 hour), the possibility of freezing may be determined to be high, and forced heating is necessary. Since the forced heating uses a cathode oxygen depletion (COD) heater, a high-voltage heater, within cooling water, fuel efficiency may be decreased. Thus, the forced heating may be used only when the forced heating is required.

In addition, operating the fuel cell stack in a low temperature for an extended period of time has an adverse effect to the durability of the fuel cell stack. In response to determining that it may be impossible to heat the fuel cell stack using only the load of the vehicle itself, the fuel cell stack may be heated rapidly even if a minimal amount of hydrogen is consumed. Accordingly, a strategy is required for determining vehicle driving conditions (e.g. whether or not the vehicle has been idling for an extended period of time, whether or not a load, such as an air conditioning heater, is used, or the like) and ambient air conditions and, if necessary, preventing freezing in pipes by forced heating.

Figure 5:
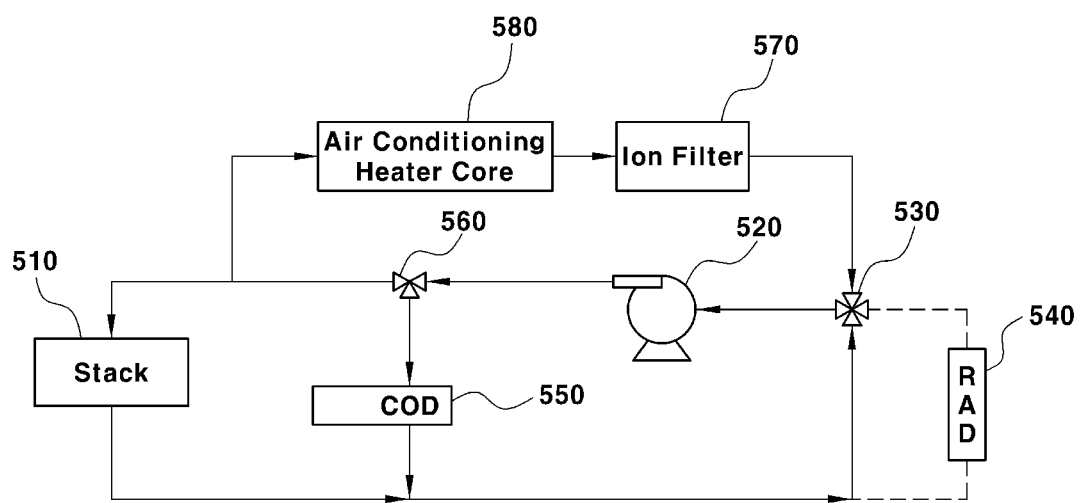
FIG. 5 is a block diagram illustrating a heat management system of the fuel cell system according to an exemplary embodiment of the present invention.

In this regard, FIG. 5 illustrates a heat management system of the fuel cell system. FIG. 5 illustrates the heat management system (TMS), including a COD heater 550, of the fuel cell system. As illustrated in FIG. 5, the COD heater 550 may be disposed on a cooling line of the heat management system, more particularly, on a bypass line that bypasses a fuel cell stack 510. The COD heater 550 may be configured to exhaust oxygen remaining on the cathode, and may be used for cold start, regenerative braking control of a long steel plate COD, cathode oxygen exhaustion in shutdown, and the like.

A cooling water bypass valve (CBV) 560 may be disposed on the rear end of the COD heater 550 and the fuel cell stack 510 to bypass cooling water to the COD heater 550. The cooling water bypass valve 560 may be configured to determine a flow rate to the fuel cell stack 510 or the COD heater 550. In addition, a cooling water pump 520 may be disposed within the heat management system to transfer cooling water to the fuel cell stack 510.

A cooling water temperature control valve (CTV) 530 may be referral to as a four-way valve, and may be configured to adjust the temperature of the fuel cell stack by adjusting the amount of cooling water introduced to a radiator 540 by adjusting the opening degree thereof. In addition, the cooling water temperature control valve 530 may be connected to a portion of the cooling line on which an ion filter 570 or an air conditioning heater core 580 is disposed. Although not shown, a controller configured to operate the cooling water pump 520, the cooling water temperature control valve 530, and the cooling water bypass valve 560 is provided.

Describing the operations of the components, the cooling water pump 520 may be configured to circulate stack cooling water to allow the fuel cells to operate at a suitable temperature. In addition, the cooling water temperature control valve 530 is a four-way valve, configured to adjust an angle of opening/closing and a flow of cooling water, based on the amount of cooling required for the fuel cell stack. When a minimal amount of cooling is required for the fuel cell stack, the cooling water temperature control valve 530 may be configured to prevent cooling water from passing through the radiator 540. In contrast, when a substantial amount of cooling is required, the cooling water temperature control valve 530 may be configured to allow cooling water to pass through the radiator 540, and thus, the fuel cell stack may maintain the optimum operating temperature.

The cooling water bypass valve 560 may be activated when it is necessary to rapidly increase the temperature of stack cooling water, as in the winter or colder temperatures, by adjusting the flow rate of cooling water to the COD heater. In addition, the COD heater 550 may be configured to consume stack current as required when increasing the temperature of stack cooling water and turning the vehicle off. The heat management system having the above-described configuration may efficiently adjust the flow rate of cooling water flowing through the cooling lines by operating the valves and the pump, and thus, the fuel cell stack may operate at the optimum temperature.

In particular, the COD heater 550 of the heat management system is provided in the control method for preventing freezing in the air exhaust system, configured to rapidly increase the temperature of stack cooling water in a short period of time to prevent the drain hose freezing. In this regard, both the fuel cell stack and the COD heater must be cooled at the same time when the COD heater is operated during normal driving of the vehicle. Accordingly, during the forced heating, the cooling water pump 520 must be operated at a predetermined speed S2 (e.g. about 5500 RPM). In particular, a lower limit of the speed of the cooling water pump may be set so that the cooling water pump operates at a speed equal to or greater than the lower limit. In addition, the cooling water pump may be set to operate at a maximum RPM.

In addition, the controller may be configured to operate both the fuel cell stack and the COD heater 550 to be sufficiently cooled by properly distributing flow rates of cooling water by adjusting the cooling water bypass valve 560 at a suitable angle of opening A (e.g. about 45°). When the COD heater operates according to a forced heating logic, the opening angle or degree of the cooling water bypass valve may be set to an angle ranging from about 40° to 50°, and thus, flow rates of cooling water may be distributed to both the fuel cell stack and the COD heater. When the temperature of stack cooling water remains at a predetermined temperature T3 (e.g. about 60° C., where T3>T2) or greater for a predetermined period of time t2 (e.g. about 2 seconds) or longer, the forced heating may be stopped. In this case, the operation of the COD heater may be stopped to avoid unnecessary power consumption, since the risk of freezing in the air exhaust system is decreased, due to the temperature of cooling water having been sufficiently increased.

Furthermore, when it is necessary to prevent the fuel cell stack or the COD heater from being overheated during the forced heating, the forced heating may be stopped immediately. Specifically, when the driver operates the vehicle by changing gems from the idling position, when an amount of current requested to the fuel cell stack is a predetermined level C (e.g. about 50A) or greater, the forced heating may be stopped due to the probability of overheating of the fuel cell stack and since the forced heating is determined to be unnecessary.

In addition, it may be possible to determine whether the COD heater is overheated, using an internal temperature sensor. When the COD heater is overheated, the forced heating may be stopped immediately. Furthermore, when the fuel cell stack is accidently overheated, the forced heating is stopped immediately to prevent the fuel cell stack from deteriorating. For example, when the temperature of cooling water at the outlet of the fuel cell stack is equal to or greater than a predetermined temperature T4 (e.g. about 80° C.) and/or a stack voltage difference is equal to or greater than D (performance deterioration due to local overheating), the fuel cell stack may be determined to be overheated, and the forced heating may be stopped.

4. Control to Prevent Secondary Damage to Stack in Case of Freezing in Air Exhaust System For proper stack reaction and endurance, the concentration of the fuel electrode must be maintained at about 70% or higher. In this regard, a hydrogen purge operation must be periodically performed to supply high concentration hydrogen and remove low concentration hydrogen. The purge valve having such a function is connected to an air outlet of a stack manifold to discharge hydrogen. This is based on the principle that hydrogen disperses according to the pressure difference between the fuel electrode and the air electrode. The differential pressure increases with increases in the freezing of the air exhaust system. When purging is performed in this condition, hydrogen may not be purged, and air may flow backward to the stack fuel electrode. When an internal pipe of the air exhaust system is clogged due to complete freezing, the vehicle may be shut down immediately, since no air is supplied.

When air flows back to the fuel electrode of the fuel cell stack due to freezing in the air exhaust system, the concentration of the fuel electrode of the fuel cell stack is decreased significantly. Accordingly, a reverse voltage may be generated due to an insufficient amount of hydrogen at the fuel electrode. When the reverse voltage state continues for an extended period of time, irreversible damage may be caused to the fuel cell stack. In particular, the reverse voltage may be reverse voltage may actually be generated for about one hour or longer. However, when additional purging is performed to restore this problem, the situation may be further worsened.

Particularly, the reverse voltage may be generated due to a variety of reasons, and may often be recovered by additional purging/draining. Thus, even when the reverse voltage is generated, the vehicle must not be shut down unconditionally. Accordingly, when the reverse voltage is accurately determined as being generated by freezing in the air exhaust system, a failsafe strategy for shutting down the system immediately is necessary to prevent secondary damage to the fuel cell stack.

In this regard, another exemplary embodiment is configured to determine whether the air exhaust system is frozen and, only when the reverse voltage is determined as being generated by the freezing in the air exhaust system, shut down the fuel cell system. Particularly, whether the reverse voltage is generated by freezing in the air exhaust system may be determined based on the following conditions:

① Ambient temperature of T5 or (e.g. about 0° C.) less
② Abnormality in air flow rate or abnormality in the opening degree of an air pressure control (APC) valve
③ Continuation of t3 (e.g. about 10 minutes) or longer after generation of a reverse voltage Here, ① and ② are conditions, based on which freezing is determined, and ③ is a condition, based on which generation of a reverse voltage is determined.

In other words, as freezing conditions, whether the ambient temperature is equal to or less than a freezing point (condition ①) may be determined and whether a sufficient period of time, for which the fuel cell stack is damaged by a reverse voltage, has passed (condition ③) may be determined. Particularly, generation of the reverse voltage may be determined, based on whether a minimum value of a stack cell voltage is less than "0".

Additionally, when freezing starts in a pipe of the air exhaust system, the flow rate of air begins to be insufficient and the opening degree of the air pressure control valve may not be operated normally due to freezing of pipe portions surrounding the air pressure control valve. Thus, when air is supplied at an abnormal flow rate or the opening degree of the air pressure control value is abnormal, as in condition ②, such case is specified as a determination condition, based on which freezing in the air exhaust system is determined. Accordingly, when the conditions ① to ③ are satisfied, it may be determined that the reverse voltage state due to freezing in the air exhaust system continues, and the fuel cell system may be shut down to prevent the fuel cell stack from being damaged.

Figure 6:
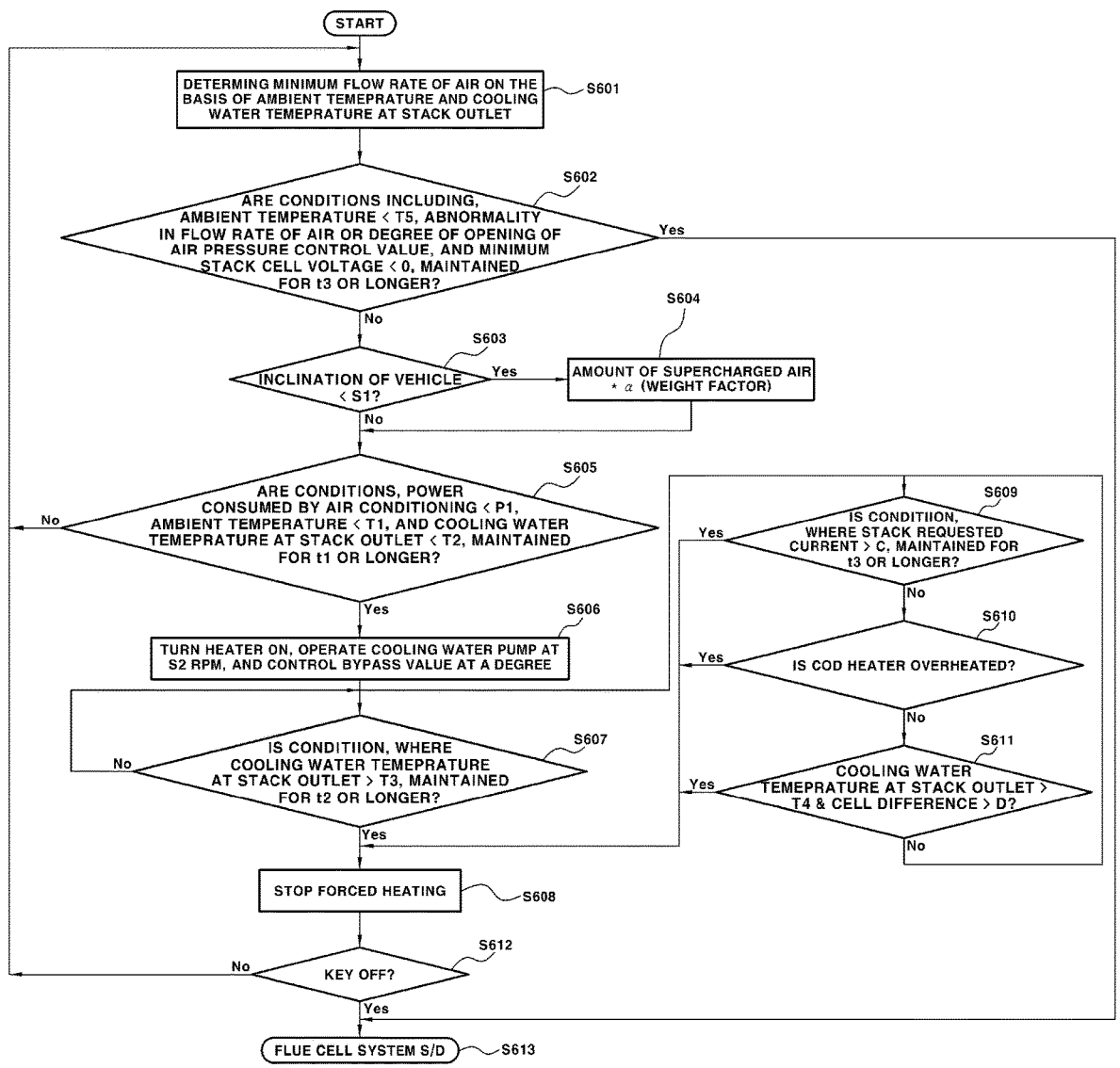
FIG. 6 is a flowchart illustrating a control method for preventing freezing in the air exhaust system of the fuel cell system according to an exemplary embodiment of the present invention.

FIG. 6 is a flowchart illustrating a control method for preventing freezing in the air exhaust system of the fuel cell system according to exemplary embodiments. The method described herein below may be executed by a controller having a processor and a memory. The control method illustrated in FIG. 6 is an example in which the air supercharging control based on the temperature of cooling water and the ambient temperature, the air supercharging control to which weights based on the inclination of the vehicle are applied, the forced heating logic using the COD heater, and the failsafe control associated with generation of a reverse voltage are integrated.

However, the example in FIG. 6 is merely an exemplary embodiment for realizing the present disclosure. The present disclosure is based on the air supercharging control based on the temperature of cooling water and the ambient temperature, in which the air supercharging control may be applied alone or in combination with other control processes. For example, only one control process of the air supercharging control to which weights according to the inclination of the vehicle are applied, the forced heating logic using the COD heater, and the failsafe control associated with generation of a reverse voltage may be additionally applied to the air supercharging control based on the temperature of cooling water and the ambient temperature.

As illustrated in FIG. 6, the present exemplary embodiment may determine a minimum flow rate of air based on the ambient temperature and the temperature of cooling water at the outlet of the fuel cell stack (S601). As described above, the minimum flow rate of air reflects an amount of supercharged air set to prevent freezing in the air exhaust system. In particular, the minimum flow rate of air may be determined using a data map of minimum flow rates of air, based on the ambient temperature and the temperature of cooling water.

Afterwards, the present exemplary embodiment may determine whether the fuel cell stack may be damaged by a reverse voltage generated due to freezing in the air exhaust system (S602). This determination logic relates to the failsafe control logic in the case of generation of a reverse voltage, designed to determine satisfaction of the three conditions ① to ③. When the three conditions ① to ③ are satisfied, damage risk to the fuel cell stack may be determined due to a reverse voltage generated by freezing in the air exhaust system and the fuel cell system may be shut down (S613). In addition, when any one of the three conditions ① to ③ is not satisfied, the present exemplary embodiment may determine that there is no freezing in the air exhaust system or the reverse voltage is not generated and the subsequent control may be performed.

Further, steps S603 and S604 are control steps of applying weights to amounts of supercharged air based on the inclination of the vehicle. According to the present exemplary embodiment, the inclination of the vehicle may be determined in step S603, and when the inclination of the vehicle exceeds a threshold value S1, the amount of air may be increased by applying a weight factor to the amount of supercharged air in step S604. In addition, the forced heating logic may be applied using the COD heater in steps S605 to S611.

First, in step S605, in a condition in which the ambient temperature is a predetermined temperature T1 (e.g. about −15° C.) or less and the temperature of cooling water at the outlet of the fuel cell stack is a predetermined temperature T2 (e.g. about 43° C.), determination may be made based on whether the load of the vehicle is in a sufficiently low load state. As described above, whether the load of the vehicle is low may be set to when power consumed by air conditioning is less than P1 due to the air conditioning system being turned off or being operated in a low level.

When the above condition is not satisfied, the process may return to step S601 to perform the air supercharging control. When the above condition is satisfied, the forced heating logic using the COD heater may be performed in step S606 and subsequent steps. Thus, as in step S606, the COD heater may be operated, the cooling water pump may be operated at predetermined RPM, and the bypass valve may be operated to be at a predetermined opening degree and thus, both the COD heater and the fuel cell stack may be cooled sufficiently.

In addition, the forced heating using the COD heater continues until the temperature of the fuel cell stack is sufficiently increased. Thus, as illustrated in FIG. 6, when the temperature of cooling water at the outlet of the fuel cell stack (or the stack outlet temperature) is equal to or greater than a predetermined temperature T3 and this state continues for a predetermined period of time t2 (S607), the process may be configured to stop the forced heating logic (S608). Afterwards, a key-off signal may be checked (S612). In a key-off state, the fuel cell system may be shut down (S613). In contrast, when there is no key-off signal, the steps subsequent to the former step S601 may be repeated.

Further, in the forced heating using the COD heater, steps S609 to S611 may be performed to prevent the COD heater or the fuel cell stack from being overheated. Specifically, when stack requiring current is a predetermined level, for example, about 50A or greater, the fuel cell stack may be damaged. In particular, the COD heater may be turned off and forced heating may be terminated (S609). In addition, when the COD heater is determined to be overheated since the temperature of the COD heater is equal to or greater the predetermined temperature, the process may be configured to turn off the COD heater and terminate the forced heating (S610).

When the temperature of cooling water at the outlet of the fuel cell stack is too high, for example, is equal to or greater than T4 (e.g., about 80° C.), or the cell voltage difference is equal to or greater than a reference D, the COD heater may be turned off and the forced heating logic may be terminated (S611). Steps S609 to S611 may be performed in parallel to step S607 of checking information regarding the temperature of cooling water of the fuel cell stack to determine whether to stop the forced heating logic. Thus, when one of the conditions of step S607, S609, S610, and S611 is satisfied, the COD heater may be turned off, and the forced heating may be stopped.

According to the control method for a fuel cell system as described above, it may be possible to efficiently prevent the problem of freezing in the air exhaust system during the winter. It may also be possible to efficiently prevent loss in the fuel cell stack by properly operating the internal components of the fuel cell system without unnecessary consumption of fuel.

Although the exemplary embodiments of the present invention have been described for illustrative purposes, those skilled in the art will appreciate that various modifications, additions and substitutions are possible, without departing from the scope and spirit of the present invention as disclosed in the accompanying claims. In addition, specific situations or materials may be variously modified without departing from the essential scope of the present invention. It is intended therefore that the scope of the present invention not be limited to the foregoing embodiments, but be defined by the claims appended hereto and their equivalents.

What is claimed is:

1. A control method for a fuel cell system, the fuel cell system comprising an air supply unit including an air blower and an air inlet shut-off valve which are disposed on a front end of an air electrode of a fuel cell stack, an air outlet shut-off valve and an air pressure control valve which are disposed sequentially on a rear end of the air electrode to discharge air, the control method comprising:

performing, by a controller having a processor and a memory, air supercharging control to increase a flow rate of air entering a fuel cell stack through the air blower and the air inlet shut-off valve, when an ambient temperature is less than a predetermined reference temperature and a temperature of cooling water of a fuel cell stack at an outlet of the fuel cell stack is within a predetermined range of temperature of supercharged air in a state in which the fuel cell stack is in a power generation state, wherein the air supercharging control includes supplying an amount of air greater than a predetermined minimum flow rate of air to prevent freezing in an air exhaust system, and the predetermined minimum flow rate of air indicates a lowest limit at which produced water in the fuel cell stack is discharged.

2. The control method according to claim 1, wherein, in the air supercharging control, an amount of supercharged air is determined based on the ambient temperature and the temperature of cooling water of the fuel cell stack leaving the outlet of the fuel cell stack.

3. The control method according to claim 1, wherein the air supercharging control is performed when the ambient temperature is less than about 0° C.

4. The control method according to claim 1, wherein the air supercharging control increases the flow rate of air entering the fuel cell stack by increasing a number of revolutions of an air blower.

5. The control method according to claim 1, further comprising:
determining, by the controller, an inclination of the vehicle; and
determining, by the controller, an amount of supercharged air by applying a weight based on the inclination of the vehicle when the inclination of the vehicle is greater than an inclination threshold value.

6. The control method according to claim 1, further comprising:
operating, by the controller, a cathode oxygen depletion heater when a state, in which an amount of power consumed by air conditioning for controlling a temperature of a passenger compartment of the vehicle is less than a predetermined reference value, the ambient temperature is less than a predetermined first temperature, and the temperature of cooling water of the fuel cell stack is less than a predetermined second temperature, is maintained for a predetermined first period of time.

7. The control method according to claim 6, wherein operating the cathode oxygen depletion heater includes:
operating, by the controller, a cooling water pump at a predetermined reference number of revolutions or greater; and
operating, by the controller, a cooling water bypass valve within a predetermined opening degree.

8. The control method according to claim 7, wherein the opening degree of the cooling water bypass valve is adjusted to be within a range from about 40° to 50°.

9. The control method according to claim 6, further comprising:
turning off, by the controller, the cathode oxygen depletion heater, when the temperature of cooling water of the fuel cell stack at the outlet of the fuel cell stack is maintained at a temperature greater than a predetermined third temperature for a predetermined second period of time.

10. The control method according to claim 6, further comprising:
turning off, by the controller, the cathode oxygen depletion heater when current output from the fuel cell stack is equal to or greater than predetermined reference current.

11. The control method according to claim 6, further comprising:
turning off, by the controller, the cathode oxygen depletion heater when the cathode oxygen depletion heater is determined to be overheated as a result of measurement of a temperature within the cathode oxygen depletion heater.

12. The control method according to claim 6, further comprising:
turning off, by the controller, the cathode oxygen depletion heater when the temperature of cooling water of the fuel cell stack is equal to or greater than a predetermined fourth temperature or a stack cell voltage difference is equal to or greater than a predetermined cell difference threshold value.

13. The control method according to claim 1, further comprising:
shutting down, by the controller, the fuel cell system when the ambient temperature is less than a predetermined fifth temperature, when abnormality in the flow rate of air or the opening degree of the air pressure control value occurs and a reverse voltage state of the fuel cell stack continues for a predetermined third period of time or longer, to prevent the fuel cell stack from being damaged.

14. The control method according to claim 1, wherein the fifth temperature is about 0° C., and generation of a reverse voltage is determined based on whether a minimum value of stack cell voltages is less than 0.

15. The control method of claim 1, wherein the air supercharging control is performed when the vehicle is in an idling state after being started.

* * * * *